United States Patent [19]

Edholm et al.

[11] Patent Number: 4,639,711
[45] Date of Patent: Jan. 27, 1987

[54] SIGNAL TRANSMITTER

[76] Inventors: Stig Edholm, Källängsvägen 8, S-181 43 Lidingö, Sweden; Bengt Stenberg, Kottvägen 3, S-191 40 Sollentuna, Sweden

[21] Appl. No.: 638,838

[22] PCT Filed: Dec. 12, 1983

[86] PCT No.: PCT/SE83/00445
§ 371 Date: Aug. 8, 1984
§ 102(e) Date: Aug. 8, 1984

[87] PCT Pub. No.: WO84/02611
PCT Pub. Date: Jul. 5, 1984

[30] Foreign Application Priority Data

Dec. 21, 1982 [SE] Sweden ................. 8207305

[51] Int. Cl.$^4$ ................. H01C 10/10; H01C 10/12
[52] U.S. Cl. ................. 338/114; 338/47
[58] Field of Search ........... 338/114, 101, 100, 99, 338/47; 178/18

[56] References Cited

U.S. PATENT DOCUMENTS 4,163,204 7/1979 Sado et al. ................. 338/114
4,426,884 1/1984 Polchaninoff ................. 338/47 X
4,492,949 1/1985 Peterson et al. ................. 338/114

FOREIGN PATENT DOCUMENTS 2752540 6/1978 Fed. Rep. of Germany ...... 338/114

Primary Examiner—E. A. Goldberg
Assistant Examiner—Marvin M. Lateef
Attorney, Agent, or Firm—Sughrue, Mion, Zinn, Macpeak & Seas

[57] ABSTRACT

The invention relates to such signal transmitters for electrical signals which comprise an elastic body (1) consisting of an elastomer matrix containing carbon black as a filling agent. The invention solves the problem of extending the field of use of such signal transmitters and is based on the realization that this is attained if the elastic body is arranged so that, when deformed, it will be subjected to bending rather than compression. The carbon black should be of the structure-forming type and present in an optimized concentration interval, generally about 5–15 parts counted on 100 parts of the elastomer.

6 Claims, 3 Drawing Figures

U.S. Patent    Jan. 27, 1987    4,639,711
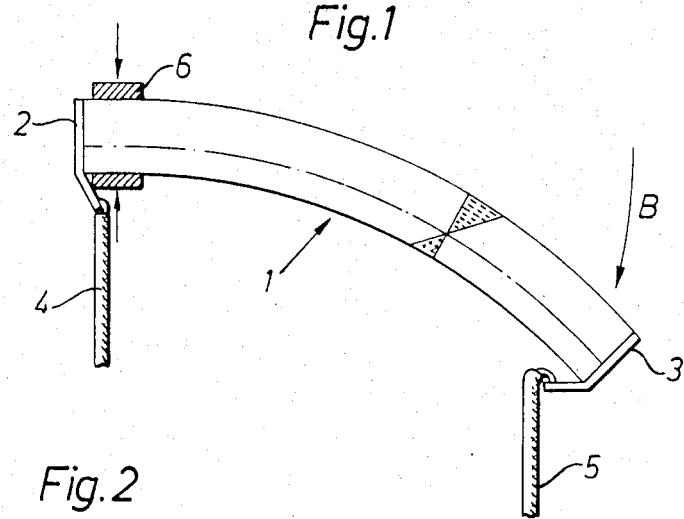
Fig.1
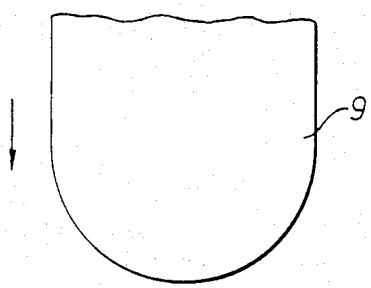
Fig.2
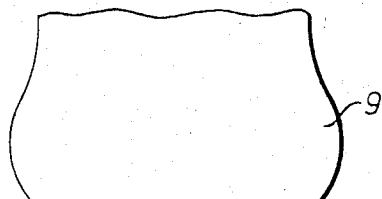
Fig.3
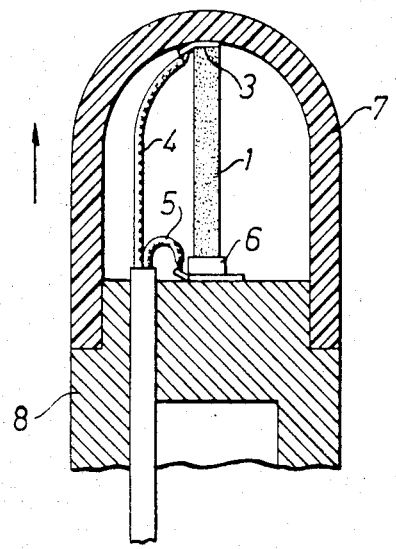
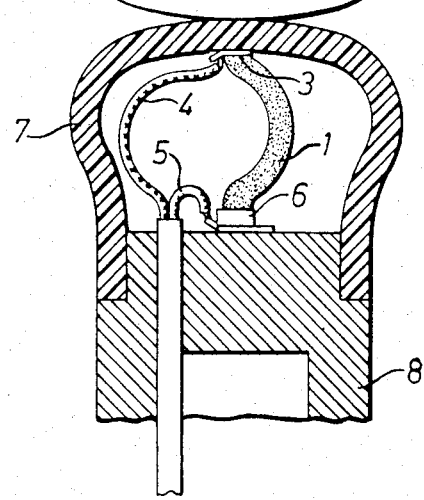

SIGNAL TRANSMITTER

It has since long been known that the resistivity of an elastic body, consisting of rubber with an addition of carbon black, is changed when the body is deformed by tension or—which deformation pattern is normally used—by compression. The physical phenomenon causing the resistivity variation may in simple terms be described as follows. Rubber without any filling agent is electrically insulating, whereas carbon black particles are conductive. However, a rubber body containing carbon black may in its entirety become electrically conductive. This change may arise in consequence of two different mechanisms which may occur either separately or together. However, in the last-mentioned case, one of the two phenomena does as a rule dominate.

The one mechanism occurs upon a deformation of the rubber body causing compression within at least some portion thereof. In that portion the carbon black particles are brought so close to one another, in the limit case they are maintained pressed against each other, that continuous current paths are formed. If the deformation consists of compression only this type of state will prevail within all of the rubber body. This mechanism may occur independently of which type of carbon black the rubber contains.

In contrast thereto the second mechanism does only occur together with carbon blacks of the types forming structure. This means that the carbon black particles have the capacity of becoming interconnected to form long chains and networks which form current paths, thus making the material electrically conductive. If such a material is later on deformed, the carbon black chains are broken and the resistivity increases. That increased resistivity will remain during a certain time interval after the forces causing the deformation are no longer applied and the rubber body has resumed its original shape. Also, the current paths are successively regenerated but the just-mentioned delay means that a hysteresis effect will be present.

In both of the two cases above described an additional contribution to the conductivity increase may arise due to the so-called tunnel effect. This effect is present when the distance between the individual carbon black particles is extremely small, which means a distance of the order of magnitude of $10^{-9}$ meters The transition resistance will then be very small and electrons may move between the particles under the influence of fluctuating thermal energy.

It has since long been known that it is possible in signal transmitters to utilize the resistivity variations above described in the way that a rubber body, containing carbon black, is connected to a signal circuit and, when a signal shall be transmitted, deformed. However, the area of use of such known signal transmitters has been very limited, primarily due to the fact that the maximum obtainable relative change of the dimensions of the rubber body, when subjected to compression, is very small. Differently put this means that the interval within which the deformation occurs is so narrow that signal transmitters of this type cannot be used when the movement interval of the control member affecting the transmitter also is not correspondingly limited. In addition thereto, a rubber body under compression exerts relatively strong reactional forces on the control member which in certain applications is unsuitable or out of question, respectively. Third, the total resistance change obtainable is comparatively small.

The object of the invention is to provide a signal transmitter which in all respects above discussed is remarkably superior to the prior art transmitters. Consequently, its elastic body shall be capable of handling great amplitudes in the movement of the control member (which term has here been used in a functional, not in a limiting, sense). Further, it shall be possible to deform the body without having to subject it to large forces which in turn could generate correspondingly large reactional forces. Last but not least it shall have such a composition that the relative resistivity change, i.e. the signal intensity, caused by a deformation of a given magnitude shall be considerably greater than that obtainable in prior art transmitters.

The invention is based on the following realization. It is possible to eliminate all of the three limitations above discussed by selecting a carbon black of a structure-forming type and by arranging the body in such a way that, when acted upon by a control force, it is bent instead of just being compressed. The meaning of this will below be explained in further detail.

FIG. 1 does diagrammatically show the element proper, the elastic body, forming part of a signal transmitter according to a preferred embodiment of the invention. Said body is shaped like a rod 1 having at its both ends connection electrodes 2, 3 for leads 4, 5 via which the transmitter is connected to an electrical signal circuit. However, since that circuit does not constitute any part of the invention, but may be of any suitable type, it has not been shown here. At its one end rod 1 is firmly secured as shown at 6 and near its opposite end subjected to a bending movement B. Under the influence of that movement the rod will be compressed below the neutral layer and stretched above that layer which conditions have in the drawing been marked with traditional symbols. In the stretched as well as in the compressed layer the resistivity of the material will be changed and those changes will get the same sign, i.e. the resulting change will equal the algebraic sum thereof. In both layers the resistiyity will increase, the reason for which will now be explained.

When the body is not subjected to any external forces the carbon black particles in the matrix thereof, which preferably is silicon rubber, have due to their high structure formed a network constituting conductive electrical paths. This network may be looked upon as being constituted by more or less continuous, string-like agglomerates of carbon black particles. When body 1 is bent, the paths in the stretched layer will, due to the elongation, be "torn off" so that the resistivity of the material in that layer is increased. Also in the compressed layer the particles are subjected in such a way that the strings are broken, i.e. a resistivity increase will occur here as well. The total resistance change, the intensity of the generated signal, will consequently be determined by this sum effect so that a very distinctive signal is obtained.

The broken conductive paths are then regenerated after a certain time delay or, stated in other terms, there will be a hysteresis effect. FIG. 1 does also directly show that the deformation caused by the control force causing bending may be much greater than when the deformation consists of compression only.

FIGS. 2 and 3 do diagrammatically illustrate one practical embodiment of the invention. Both figures show a horizontal section through the adjacent portions of a pair of sliding doors, for example of the type used in buses or subway train cars. The doors have been given reference numerals 8 and 9. In FIG. 2 they are slightly spaced from each other during a closure movement, whereas in FIG. 3 they have been brought into mutual contact. Each of them is, in a manner known per se, along its vertical end surface provided with a rubber rim 7 of U-shaped cross-section which in its deformed state yields a sealing function. In the cavity between rubber rim 7 and the rigid part of the door frame there is mounted a slender rubber member 1 the dimension of which in the vertical direction may be rather small in which case it may be looked upon as a horizontally extending rod. The one end thereof is attached to the door frame and the other end to the inner wall of sealing rim 7. At each end there is an electrode 2, 3 provided with connection wires 4 and 5 as described above with reference to FIG. 1.

When the sealing rims 7 of the two doors come into contact with each other and are thereby deformed, body 1 is bent as shown in FIG. 3 so that there arises a change of its resistivity which in turn generates a signal. As should be understood, it is an important advantage of such an arrangement that, thanks to the fact that the deformation is by bending rather than by compression and the body may conveniently be given a suitable configuration, e.g. be shaped as a slender rod, the movement interval within which deformation may take place can be a multiple of that at disposal when the body is compressed according to the adopted prior art. Another advantage is the greater relative resistance change caused partly by use of high structure carbon black within an optimized concentration interval, partly by the additive effect above explained. A third advantage is the low reactional forces by which the signal transmitter body responds to the deformation.

The embodiment above described is intended only to exemplify one out of a very large number of applications. Some such other applications are use of the transmitter body, either as a separate component or integrated with other details, in different types of contact mats acting as signal transmitters when passed by human beings, vehicles or goods, for example near escalators, garage doors, in warehouses or in other industrial applications. The term "signal transmitter" has been used here in an extensive meaning and does not only cover use of the subject of the invention as a sensor element but also as an electrical switch. The signal transmitted may be in the form of a current pulse or an interruption of a normally continuous current. In some applications amplification of the signal current is desirable, in other cases superfluous.

The elastomer forming the matrix of the rubber body does suitably consist of a material the intrinsic conductivity of which is very low. This is suitable for two reasons. First, this means that, as a matter of principle, all of the electric current will pass via the carbon black particles only. Second, such a rubber material has very good elastic properties. When the conductive paths are broken in the way above described there will consequently not remain any net current. This makes it possible to use a signal pattern strictly of the ON/OFF-type. Examples of elastomers having such an extremely low self-conductivity are non-polar elastomers not containing any contaminations, preferably silicon rubber and EPDM (ethen-propen-diene-rubber).

The carbon black shall always be of the structure-forming type. In many cases it may have high structure.

On the other hand, high structure does adversely affect the elasticity properties which in turn yields a higher hysteresis. This may manifest itself as a drift of the zero current point, which is undesirable in several applications. Consequently, in the practical working of the invention the selection between carbon black types having different structures will generally be a compromise between the demands for optimized electric and elastic properties, respectively.

The concentration of the carbon black should be at least 5 and, as a maximum, 40 parts (counted on 100 parts of the elastomer). Preferably, the carbon black content should be in the approximate interval of 10-15 parts. Below 5 parts the number of carbon black particles will be insufficient for a reliable formation of a network of conductive paths. Within the approximate interval 5-15 parts of carbon black a small change of the concentration will be accompanied by a large change of the resistivity. Since basically the matrix only undergoes a volume change when deformed, whereas the total volume of the carbon black particles remains constant, the deformation may be considered equivalent with a change of the carbon black concentration. The upper limit thereof is primarily determined by the requirement for physical strength of the transmitter body. When the carbon black content is very high, the strength will be that low that the product is no longer practically usable. Within the concentration interval 5-15 parts two essential advantages are simultaneously attained. On the one hand, the concentration is then that high that the electrical properties of the material, in terms of maximum relative resistivity change, is obtained but, on the other, it is that low that the mechanical properties which are essential in the context, elasticity and strength, still have very good values.

Finally, it should again be underlined that the drawing and the related portion of the text do only illustrate the generic inventive concept and one exemplifying embodiment. The inventive idea resides in the realization that optimized properties are attained by the addition, to an elastomer matrix, of structure-forming carbon black and when such a matrix is subjected to a deformation pattern consisting of bending rather than compression. It follows therefrom, that the detailed arrangement of the corresponding devices may be varied in many ways. This does by way of example apply to the location of the electrodes. It is not necessary for them to be mounted at the ends of the elastomer body but they may also be located in other positions. Further, the number of electrodes may be greater than two and a given signal transmitter element may be provided with electrodes connected to mutually independent signal circuits.

We claim:

1. A signal transmitter, comprising an elastically deformable body in the form of a matrix consisting of an elastomer containing carbon black as a filling agent, the signal being generated by a change of the electrical resistance of the body when subjected to deformation and outputted via a pair of electrodes, characterized in that said body is an elongate body, the carbon black is of a structure-forming type so that the body has a relatively low electrical resistance in the undeformed state, and in that said electrodes are respectively connected to the opposite longitudinal ends of said elongate body, so that, when the body is deformed between said ends by bending, said resistance becomes only higher.

2. A signal transmitter as claimed in claim 1, characterized by a non-polar rubber having extremely low self-conductivity and being devoid of any contamination.

3. A signal transmitter as claimed in claim 1 or 2, characterized in that the concentration of the carbon black in the matrix is at least 5 parts, preferably around 10–15 parts, as counted on 100 parts of the elastomer.

4. A signal transmitter as claimed in claim 2, wherein the non-polar rubber is silicon rubber.

5. A signal transmitter as claimed in claim 2, wherein the non-polar rubber is ethen-propen-diene-rubber.

6. A signal transmitter as claimed in claim 1 characterized in that, when the elongate body is bent, the resistivities of both the portion of the body under tension and also the portion of the body under compression are only increased.

* * * * *